Figures 1, 2:
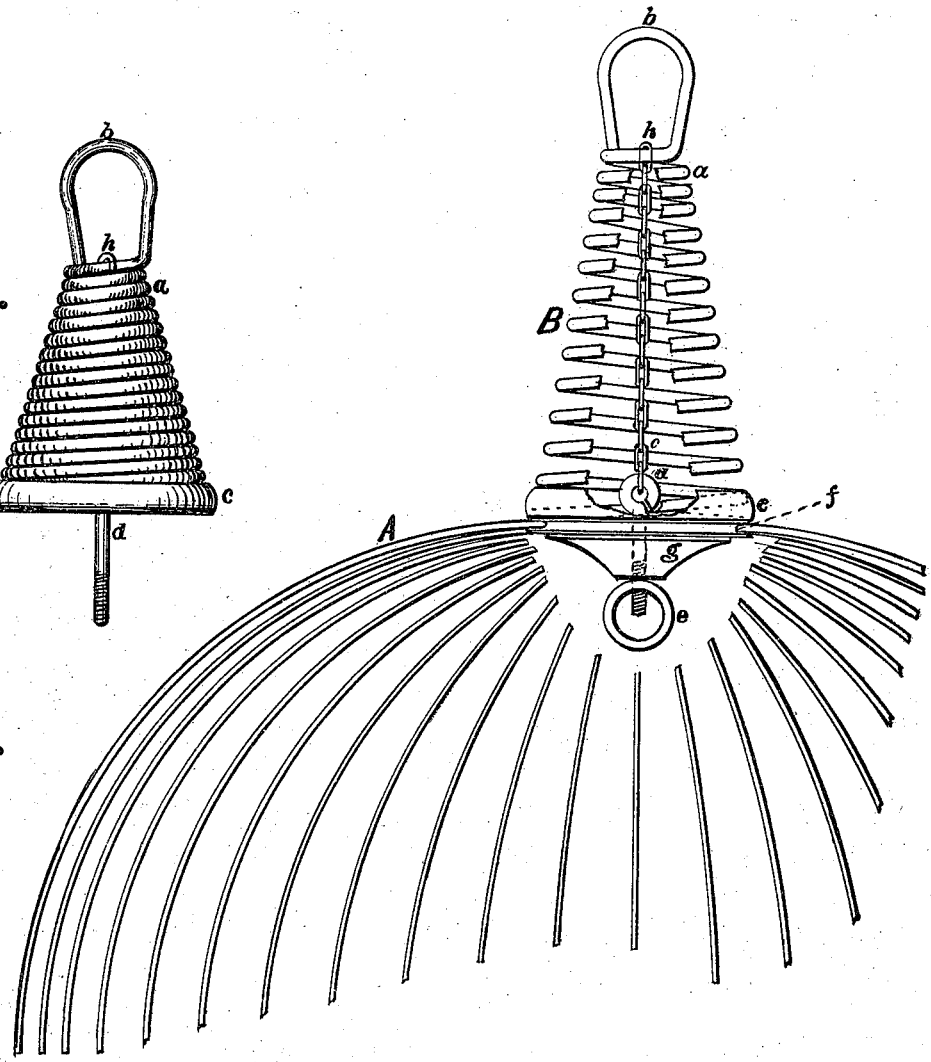

G. R. OSBORN & B. A. DRAYTON.
BIRD-CAGE.

No. 173,416.  Patented Feb. 15, 1876.

Witnesses
Harry W. Lawrence
Charles Hecox

Inventors.
George R. Osborn
Benj. A. Drayton

UNITED STATES PATENT OFFICE.

GEORGE R. OSBORN, OF EAST ORANGE, NEW JERSEY, AND BENJAMIN A. DRAYTON, OF NEW YORK, N. Y.

IMPROVEMENT IN BIRD-CAGES.

Specification forming part of Letters Patent No. 173,416, dated February 15, 1876; application filed October 8, 1875.

*To all whom it may concern:*

Be it known that we, GEO. R. OSBORN, of East Orange, county of Essex and State of New Jersey, and BENJ. A. DRAYTON, of New York, county of New York and State of New York, have invented a new and useful Improvement in Bird-Cages; and we do hereby declare that the following is a full and exact description thereof, to enable others to construct and use the same, reference being had to the accompanying drawing forming a part of this specification.

The object of our invention is to suspend a bird-cage by an elastic medium, so that the movements of the bird within the cage will produce an effect similar to the branches of a tree when a bird alights thereon; and our invention consists, first, in attaching a spring to the body of the cage in a fixed vertical position; second, in attaching the spring to the cap or top plate of the cage; and, thirdly, in the special means for securing the spring to the cap, hereinafter fully described and claimed.

In the drawing, Figure 1 shows a portion of the top of a cage with a spring attached, the parts being broken to show the details of construction. Fig. 2 shows a coiled spring and the top plate detached from the cage.

A represents the upper part of the body of a cage; B, the spring; c, the top plate or cap, having its edges turned up and inward to form a flange for securing the lower coil of the spring in place. d is a bolt, having an eyelet-head and ring-nut e, for securing the parts composing the top plate of the cage. f is an eyelet for embracing the ends of the wires forming the body of the cage, the wires being soldered or compressed within the external groove formed thereon. g is a disk arranged within the cage, and through which the bolt d passes, forming a bearing for the nut e. h is a chain, which connects the upper end of the coil-spring with the bolt-head d. The object of this device is to limit the extension of the spring, and prevent its distending to such an extent as to fail to recover its elasticity.

We do not confine ourselves to the form of spring shown, as it is obvious that it may be formed in various shapes—as, for instance, upon a straight mandrel—and a strip of sheet metal may be used in preference to the round wire; or an elliptic form of spring may be substituted, and for appearance' sake the several forms of springs may be covered by a spun sheet-metal shell. The conical coiled spring shown is preferred to present the best appearance.

We are aware that a bird cage has been suspended by an elastic medium, and this, therefore, we do not, broadly, claim; but we are not aware that a spring or elastic medium has been so applied as to maintain itself in a vertical position at all times, and which greatly facilitates the act of hanging the cage.

We claim as our invention—

1. A bird-cage provided with a suspending-spring attached to the body of the cage in a fixed vertical position, as shown.

2. The combination of the top plate or cap and a spring rigidly attached thereto, for the purpose specified.

3. The top plate having the turned flange c, for securing the spring B, substantially as shown and described.

GEORGE R. OSBORN.
BENJ. A. DRAYTON.

Witnesses:
HARRY W. LAWRENCE,
CHARLES HECOX.